United States Patent [19]

Hall et al.

[11] 4,247,523

[45] Jan. 27, 1981

[54] PELLETIZING SULFATION OF TITANIUM CONCENTRATES

[75] Inventors: Rotrou A. Hall, Mississauga; Gerald V. Glaum, Oakville, both of Canada

[73] Assignee: The International Nickel Company, Inc., New York, N.Y.

[21] Appl. No.: 132,857

[22] Filed: Mar. 24, 1980

[30] Foreign Application Priority Data

Jun. 14, 1979 [CA] Canada .................................. 329747

[51] Int. Cl.³ ............................................. C01G 23/00
[52] U.S. Cl. ..................................... 423/82; 423/544; 75/1 T; 75/3; 75/115
[58] Field of Search ................ 423/69, 82, 83; 75/1 T

[56] References Cited

U.S. PATENT DOCUMENTS

| 1,977,208 | 10/1934 | Saklatwalla | 423/82 |
| 2,990,250 | 6/1961 | Moklebust | 423/69 |
| 4,036,785 | 7/1977 | Saito | 423/82 |

FOREIGN PATENT DOCUMENTS 556038  4/1958  Canada .................................. 423/82

*Primary Examiner*—Brian E. Hearn
*Attorney, Agent, or Firm*—E. C. MacQueen; R. J. Kenny

[57] ABSTRACT

A titaniferous ore concentrate or slag is fed, together with sulfuric acid, into a heated pelletizer wherein the sulfation reaction occurs simultaneously with pellet formation.

6 Claims, 2 Drawing Figures

PELLETIZING SULFATION OF TITANIUM CONCENTRATES

FIELD OF THE INVENTION

The present invention relates to the solubilization of titanium present in ore concentrates or slags by treatment of the concentrate or slag with sulfuric acid to sulfate the titanium.

BACKGROUND OF THE INVENTION

It is well known in the art that titaniferous ores and slags can be attacked with concentrated sulfuric acid to solubilize the titanium as part of a process for producing titanium dioxide pigment. When such an acid attack is carried out on, for example, an ilmenite concentrate to sulfate both the iron and titanium contained therein, the generally adopted procedure involves mixing the finely ground concentrate with concentrated sulfuric acid in vats and adding a small amount of water. The heat of dilution of the acid initiates the reaction while the exothermic nature of the reaction itself enables it to propagate through the charge. As the sulfation proceeds, the charge within the vat thickens and then rapidly solidifies. An air sparge through the slurry is resorted to as a means of maintaining a homogenous suspension and obtaining a porous charge which can be leached from the vat after solidification.

The paste-like consistency acquired by the slurry in the course of the reaction, and its subsequent rapid solidification present severe obstacles to the devising of a procedure for implementing the acid attack in a continuous manner. One prior suggestion for avoiding the materials handling problem is described in U.S. Pat. No. 2,098,026. Essentially the solution advocated there entails recycling some sulfated titanium product and mixing it with the incoming ore feed so that when the appropriate amount of acid is added to the mixture, the initial charge for the acid attack process is in the form of a wet granular feed rather than a slurry. This granular feed is then fed to a gas-fired kiln where it is kept agitated while the sulfation reaction takes place. With such a process the alleged improvement in materials handling is gained at the expense of the overall efficiency of the process since the recycling of substantial amounts of sulfated product limits the utilization of the kiln space thereby necessitating the use of a kiln which is larger than would otherwise be needed. Moreover, a substantial amount of the energy used in the process is wasted on heating and agitating the reacted material.

Various other techniques have been advocated for carrying out an acid attack continuously, a common feature of these processes being that they rely on some form of mechanical device to break up the charge continuously as sulfation and solidification thereof occurs. Thus, in U.S. Pat. No. 2,098,025 a first technique is described which involves preparing a slurry of the titanium concentrate and sulfuric acid, charging the slurry to a pre-heated vessel in which the reaction is initiated, and allowing the partly reacted slurry to overflow into a heated pan equipped with a rotating plow-share. Another technique described in that same patent comprises charging the pre-mixed concentrate slurry into a heated inclined rotating kiln which is equipped with stationary scrapers projecting from the kiln shaft towards its inner walls. The acid attack is initiated in the upper end of the kiln, and as the reacting mass travels down the kiln, it is continually scraped off the walls and broken up to be finally discharged as a granular powder.

A somewhat similar approach is described in U.S. Pat. No. 2,557,528 which also entails the use of a heated inclined rotary kiln into which pre-mixed slurry is fed. In this case the scraping and breaking up action is provided by a finned rod freely lying within the kiln. In U.S. Pat. No. 2,098,055, a plurality of parallel helicoidal screws rotating at different speeds are relied upon to break up the reacting charge of titanium concentrate and sulfuric acid. Yet another alternative technique, described in U.S. Pat. No. 2,098,054 involves carrying out the acid attack in a heated ball mill so that the reacting mass is continuously pulverized.

None of the above proposed techniques provides an entirely satisfactory solution to the problem of carrying out the desired acid attack efficiently inasmuch as the various mechanical devices, in addition to constituting capital expenses in themselves, inherently entail a wastage of energy used for continuously breaking up the solidifying mass.

OBJECT OF THE INVENTION

The present invention is aimed at providing a process whereby acid attack of titaniferous solids can take place efficiently in comparatively simple apparatus which does not incorporate complex mechanical devices for breaking up the reacting mass.

A further object of the invention is to form a product which is highly suitable for continuous water leaching to dissolve the titanium salts produced in the sulfation.

SUMMARY OF THE INVENTION

According to the invention, a process is provided for treating particulate material comprising a titaniferous ore concentrate or slag with sulfuric acid to recover water soluble titanium compounds in solid form, wherein the improvement comprises introducing the particulate material and concentrated sulfuric acid into a heated pelletizing apparatus, maintaining the material at a temperature between 180° and 240° C. while forming pellets thereof, and withdrawing formed pellets at such a rate as to provide a residence time of between 0.5 and 4 hours for the material in the pelletizing apparatus, whereby reaction between the sulfuric acid and material to solubilize at least part of the titanium present takes place simultaneously with formation of the pellets.

We have found that when the titaniferous material is subjected to hot pelletization, the sulfation of at least part of the titanium, which occurs during the pelletization operation, results in the formation of strong dry pellets which are conveniently handled within, and readily withdrawn from, the pelletizer. To ensure the attainment of such a desirable result, it is essential to control the temperature during pelletization to within the range 180° to 240° C. Too low a pelletization temperature would result in little or no sulfation occurring simultaneously with pellet formation, any pellets so produced would be weak and mushy in view of their high acid content. At the other extreme, too high a pelletizing temperature would bring about an unacceptably high amount of acid evaporation, and heavy fuming is wasteful as well as being environmentally objectionable. For these reasons, it is preferred that the pelletization be carried out at 190° to 210° C., e.g., 200° C.

The novel process of the invention is commercially attractive for several reasons. Firstly, it provides a convenient way of carrying out the sulfation in a continuous manner and yet in relatively simply apparatus. Secondly, the product obtained is easily handled and susceptible to a continuous water leaching operation with a relatively short retention needed for dissolution.

The heat needed to maintain the pelletizer charge at the desired temperature is provided to a large extent by the exothermic heat of the sulfation reaction. The supplemental heat needed for temperature control can be supplied in any convenient manner, for example, by blowing hot air around the pelletizer. The blowing of hot air directly onto the pellets in the pelletizing chamber is undesirable for two reasons. Firstly, it leads to excessive sulfuric acid losses by vaporization. Moreover, a small amount of trivalent titanium is present in the pellets and is desirable in the subsequent hydrolysis stage; hot air blown onto the pellets would oxidize such trivalent titanium to its tetravalent state. The invention is not restricted to the use of any particular design of pelletizer and, in fact, it can be practiced with any disc-pelletizer or drum-pelletizer of known design providing the pelletizer is equipped with means for heating and maintaining its charge within the desired temperature range. Preferably the apparatus should also be equipped with means for coping with the fumes given off during the hot pelletization.

The titaniferous slag or concentrate and the appropriate amount of sulfuric acid may be fed individually into the pelletizer and mixed therein, for example, by arranging for the acid to be sprayed onto the solids within the pelletizer. We have found it more convenient, however, to pre-mix the solids with the acid at ambient temperature and continuously feed the resulting slurry into the pelletizer.

The relative proportions of solids and acids have to be chosen in accordance with the composition of the solids in question. In general, we have found that in order to maximize the solubilization of titanium, the amount of sulfuric acid used should preferably be selected so as to correspond to between 110 to 150 percent of the stoichiometric requirement for sulfation of the solids. As used herein the "stoichiometric requirement" refers to the theoretical total amount of acid needed to form sulfates of any sulfatable metals, other than titanium, present in the solids (such as ferrous or ferric iron, manganese, magnesium, aluminum or calcium) and to convert all the titanium in the solids to the compound $TiOSO_4$. In practice a portion of the titanium will be present as $Ti(SO_4)_2$ and $Ti_2(SO_4)_3$ in the pelletized product.

The extent to which solubilization occurs within the pelletizer will depend on both the temperature and duration of the pelletizing operation. While it is possible to aim for a substantially complete solubilization to take place within the pelletizer, we have found it unnecessary to resort to the long retention times, and hence large pelletizer vessels, that would be necessitated thereby. We have found that providing sulfation occurs to a sufficient extent within the pelletizer to ensure dry, manageable pellets of adequate strength, additional sulfation can be made to take place outside the pelletizer in a simple heat treatment furnace. Such a heat treatment, which we refer to herein as a curing operation, merely involves maintaining the pellets withdrawn from the pelletizer at a temperature of 180° to 240° C., i.e., a similar temperature to that at which the pellets were formed. Since the vessel used for curing need not be subjected to mechanical movement to impart any vibratory or tumbling motion to the pellets, the curing vessel is more economical to operate than the pelletizer. Energy required by the curing vessel is minimized by the feeding of hot pellets directly from the pelletizer, as well as by the exothermic heat released as sulfation proceeds. Accordingly, it is preferred to employ the minimum pelletizing residence time consistent with adequate pellet dryness and strength, e.g., 0.5 to 1 hour, and thereafter heat treat the pellets in a curing vessel for a period of at least 0.5 hour and as long as 4 hours or longer to complete the titanium solubilization.

The sulfation process of which the present invention is an improvement is most widely applied in the production of titanium dioxide pigments. The sulfation is carried out either on a concentrate of titanium ore, or alternatively the concentrate in question is first smelted to produce a pig iron product and a titanium enriched slag and the latter is subjected to the sulfation process. In either case the sulfation is followed by a water leaching which leaves undissolved siliceous slimes as well as unreacted concentrate or slag. The unreacted material is generally coarser than the slimes and can be separated and recycled to the sulfation operation. The clear liquor can then be treated if necessary to crystallize ferrous sulfate and after removal of the latter a high purity titanium dioxide can be obtained by boiling the liquor to effect hydrolysis of the dissolved titanium.

The titaniferous solids to be sulfated should be ground if necessary to ensure particle size adequate for good pelletization. While no specific particle size is crucial to successful operation of the process of the invention, it is preferable to adopt a grinding that ensures that at least 90 percent of the solids are finer than 200 mesh (Tyler Screen Size). Such a solids feed can be formed into pellets of the order of 0.1 to 1.5 cm diameter. Depending on the amount of pellet fracture that occurs during pelletization, it might be necessary to crush some of the pellets and return them to the pelletizer to act as seed.

Some examples of the invention will now be specifically described.

DETAILED DESCRIPTION OF THE EMBODIMENT

Figure 2:
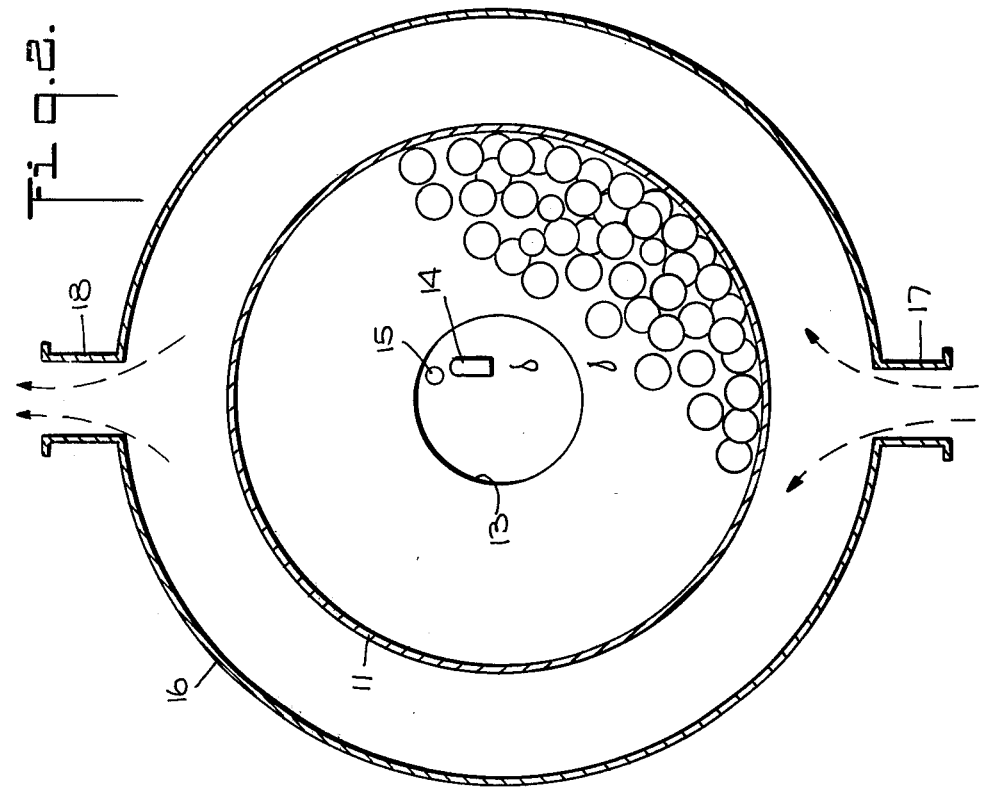
FIG. 2 is an orthogonal cross sectional view through the line II—II of FIG. 1.
Figure 1:
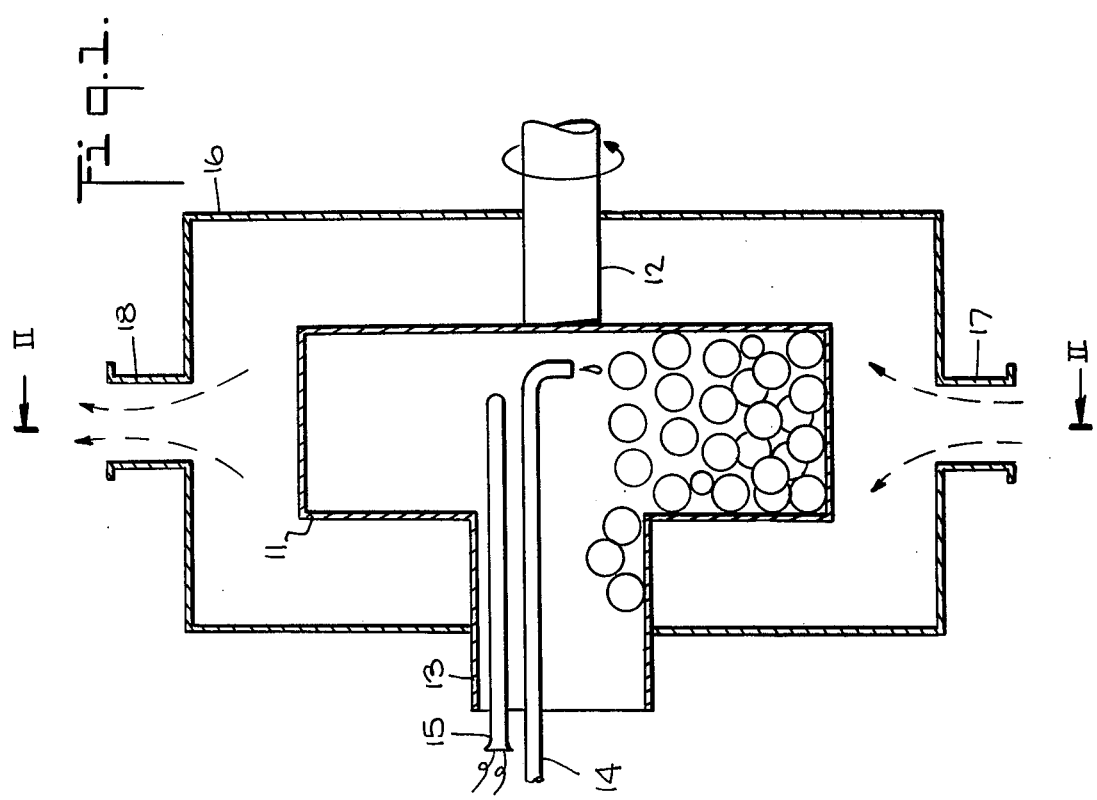
FIG. 1 of the accompanying drawings illustrates a cross section of apparatus which can be used for carrying out hot pelletization in accordance with the invention.

The drawings illustrate the design of a pelletizing drum used to carry out the tests hereinafter described. The drum 11 was a 15 cm diameter, 5 cm long cylinder rigidly mounted on a rotatable drive shaft 12 connected to a drive motor (not illustrated). The drum was provided with a flanged 5 cm port 13 at the center of the planar face remote from the drive shaft. A feed pipe 14 entered the drum through the port 13 and was positioned so as to deliver slurry at a point close to the center of the drum 11. A thermocouple 15 was fitted through the port 13 to sense the temperature within the drum. The port 13 also provided a means of egress for the pellets from the drum. Surrounding the drum was a stationary housing 16 equipped with an inlet aperture and an outlet aperture 17 and 18 respectively. In operation hot air from an electric heating fan (not illustrated) was blown into the aperture 17 and withdrawn from the aperture 18 to provide the flow pattern indicated by the broken arrows in the space between the rotating drum 11 and the stationary housing 16.

A series of tests were conducted on a titanium slag which contained, by weight:

| | |
|---|---|
| Titanium: | 43.9% |
| Iron: | 9.9% |
| Magnesium: | 3.3% |
| Aluminum: | 3.0% |
| Calcium: | 0.8% |
| Silica: | 5.3% |

The slag was ground to −200 Mesh (Tyler Screen Size) and mixed with sulfuric acid of 95.5% by weight concentration. The amount of sulfuric acid used in the three tests varied between 120 and 180% by weight of the slag. The pre-mixed slurry was introduced into the apparatus illustrated at such a rate as to allow for a 30 minute retention time within the pelletizing drum. The latter was rotated at 25 revolutions per minute during the pelletizing operation and hot air was circulated around the drum to maintain the temperature within the drum at 200° C. Pellets removed from the drum were transferred to a curing vessel where they were maintained at 200° C. for a 2 hour curing period. Thereafter the pellets were water leached and assays carried out to determine the degree of solubilization of titanium which had been achieved. The water leaching in each case involved contacting the pellets with an equal weight of water for a period of 1 hour at 60° C.

The results of these three tests are shown in Table I below. In that Table, the acid addition used in pelletizing is expressed both in terms of a percentage by weight of the slag as well as a percentage of the stoichiometric amount as hereinbefore described. The pellet weight which is also expressed as a percentage by weight of the titanium slag indicates the extent of loss of water (steam) produced in the sulfation reaction and also of acid loss by fuming during the pelletization. The solubilization measurements illustrate the benefit of using acid amounts in excess of the stoichiometric requirement during the pelletization.

TABLE 1

| Test | Acid Addition | | Pellets | | Ti solubilized (%) |
|---|---|---|---|---|---|
| | Weight (% of slag) | % Stoichiometric* | Diameter (cm) | Weight (% of slag) | |
| 1 | 120 | 86.4 | 0.5–0.7 | 204 | 65 |
| 2 | 150 | 108.0 | 0.5–1.0 | 225 | 76 |
| 3 | 180 | 129.6 | 0.8–1.2 | 251 | 88 |

*Based on formation of sulfates of Fe, Mg, Al, Cu and conversion of Ti to TiOSO₄.

A fourth test was carried out on an ore concentrate rather than a slag. The ilmenite concentrate used analyzed, by weight:

| | |
|---|---|
| Titanium: | 28.4% |
| Ferrous Iron: | 24.6% |
| Ferric Iron: | 11.5% |
| Manganese: | 0.81% |
| Magnesium: | 0.38% |
| Calcium: | 0.14% |
| Aluminum: | 0.42% |
| Silica: | 1.6% |

The concentrate was ground, pelletized and cured in the same manner as the slag of tests 1 to 3, except that the pelletizer temperature in this case was maintained at 215° C. The amount of acid used in this fourth test was 1.65 grams per gram of concentrate, which corresponded to 120% of the stoichiometric requirement. The pellets obtained which ranged in diameter from 0.5 to 1.2 cm amounted to 2.4 grams per gram of concentrate tested. Water leaching of the pellets in the manner described above showed that an 83% solubilization of the titanium had been achieved.

While the present invention has been specifically described with reference to preferred embodiments thereof, it will be readily understood by those skilled in the art that various additions to, or modifications of, the details of the embodiments may be resorted to without departing from the scope of the invention which is defined by the appended claims.

We claim:

1. In a process for treating particulate material comprising a titaniferous ore concentrate or slag with sulfuric acid to recover water-soluble titanium compounds in solid form, the improvement which comprises introducing the particulate material and concentrated sulfuric acid into a heated pelletizing apparatus, maintaining the material at a temperature between about 180° and 240° C. while forming pellets thereof, and withdrawing formed pellets at such a rate as to provide a residence time of between about 0.5 and 4 hours for the material in the pelletizing apparatus, whereby reaction between the sulfuric acid and material to solubilize at least part of the titanium present takes place simultaneously with formation of the pellets.

2. A process in accordance with claim 1 wherein the particulate material is pre-mixed with the acid at ambient temperature and continuously introduced into the pelletizing apparatus as a slurry.

3. A process in accordance with claim 2 wherein the amount of acid used in forming the slurry corresponds to between about 110 and 150 percent of the stoichiometric amount needed to react fully with any sulfatable metal(s) other than titanium present in the particulate material and to convert all of the titanium present to the compound TiOSO₄.

4. A process in accordance with claim 2 further including the step of subjecting the pellets withdrawn from the pelletizing apparatus to a curing heat treatment of about 0.5 to 4 hour duration at about 180° to 240° C., whereby further reaction takes place between sulfuric acid and material in the pellets to maximize solubilization of the titanium.

5. A process in accordance with claim 4 wherein the temperature at which the material is pelletized and the temperature at which the pellets are cured are between about 190° and 210° C.

6. A process in accordance with claim 4 wherein the cured pellets are subjected to water leaching and unreacted residue from the water leaching is recycled to the pelletizer for further treatment with sulfuric acid.

* * * * *